United States Patent
Tiainen et al.

(10) Patent No.: US 6,403,140 B1
(45) Date of Patent: Jun. 11, 2002

(54) JELLYING PRODUCT

(75) Inventors: Ilkka Tiainen, Helsinki; Juha Oravainen, Jokioinen; Timo Piilola, Forssa, all of (FI)

(73) Assignee: Sohkar Oy, Kantvik (FI)

( * ) Notice: Subject to any disclaimer, the term of this patent is extended or adjusted under 35 U.S.C. 154(b) by 0 days.

(21) Appl. No.: 09/269,435

(22) PCT Filed: Sep. 25, 1997

(86) PCT No.: PCT/FI97/00576

§ 371 (c)(1),
(2), (4) Date: Mar. 26, 1999

(87) PCT Pub. No.: WO98/12935

PCT Pub. Date: Apr. 2, 1998

(30) Foreign Application Priority Data

Sep. 27, 1996 (FI) .................................................. 963905

(51) Int. Cl.[7] ............................................. A23L 1/0562
(52) U.S. Cl. ........................................ 426/576; 426/592
(58) Field of Search ................................... 426/592, 576

(56) References Cited

U.S. PATENT DOCUMENTS

| | | | | |
|---|---|---|---|---|
| 398,915 A | * | 3/1889 | Tower | |
| 480,687 A | * | 8/1892 | Beaumont | |
| 1,586,129 A | * | 5/1926 | Thiele | |
| 1,896,049 A | * | 10/1933 | Zeigler | |
| 1,929,732 A | * | 10/1933 | Zeigler | |
| 2,163,164 A | * | 6/1939 | Wickenden et al. | |
| 2,201,028 A | | 5/1940 | Cordier | 260/33 |
| 2,224,167 A | * | 12/1940 | Stokes et al. | |
| 2,244,183 A | | 6/1941 | Austin | 260/33 |
| 2,292,464 A | | 8/1942 | Moss | 106/186 |
| 2,412,305 A | * | 12/1946 | Stokes et al. | |
| 2,499,932 A | | 3/1950 | Sido | 260/30.8 |
| 2,657,996 A | * | 11/1953 | Ferguson | |
| 3,018,181 A | * | 1/1962 | Corben et al. | |
| 3,067,036 A | * | 12/1962 | Pintauro et al. | |
| 3,152,913 A | * | 10/1964 | Polya et al. | |
| 3,218,176 A | * | 11/1965 | Polya et al. | |
| 3,335,107 A | | 8/1967 | Dill | 260/30.4 |
| 3,436,224 A | * | 4/1969 | Bode | 99/31 |
| 3,491,147 A | | 1/1970 | Hickner | 260/556 |
| 3,554,771 A | * | 1/1971 | Wiczer | 99/189 |
| 3,748,296 A | | 7/1973 | Balbach et al. | 260/308 |
| 3,795,747 A | * | 3/1974 | Mitchell | 426/192 |
| 3,803,072 A | | 4/1974 | Graham et al. | 260/29.6 |
| 3,843,809 A | * | 10/1974 | Luck | 426/192 |
| 4,197,325 A | * | 4/1980 | Ono et al. | |
| 4,224,353 A | | 9/1980 | Kueper et al. | |
| 4,310,559 A | * | 1/1982 | Mita et al. | 426/101 |
| 4,341,810 A | | 7/1982 | Shank | |
| 4,554,169 A | | 11/1985 | Anderson et al. | |
| 5,019,414 A | * | 5/1991 | Valdes | 426/573 |

FOREIGN PATENT DOCUMENTS

| | | | |
|---|---|---|---|
| DE | 866248 | 7/1949 | |
| FR | 912502 | 4/1944 | |
| FR | 2075.146 | 12/1970 | |
| FR | 2.110.338 | 10/1971 | |
| GB | 455695 | 10/1936 | |
| GB | 2066042 A | 12/1980 | |
| JP | 57-144967 | * 9/1982 | ................. 426/592 |
| JP | 63-049064 | * 3/1988 | ................. 426/592 |
| SU | 1068093 A | 1/1984 | |
| SU | 1692518 A | 11/1991 | |

OTHER PUBLICATIONS

JP 6/286036 (Derwent's Abstract AN 94–363177), Tokai Rubber Ind., Ltd.; Fuel Hose Of Motor Car Having Good Cracking Resistance—Comprising Inner Layer Of Flourine–Contg Resin, Polyamide Intermediate Layer And Braided Metallic Wire Outer Layer.

JP 2/221467 (Derwent's Abstract AN 90–310356/41),; Permanent Adhesive Interlining Cloth Obtained By Applying Hot Melt Polyamide Adhesive Paste To Cloth Substrate.

SU 216.708 (Derwent's Abstract AN 68–31312Q), Esterification Of Alkylsulphochlorides With Polyhydric.

Webster's II New Riverside University Dictionary, p. 523 (1984).*

* cited by examiner

Primary Examiner—Nina Bhat
(74) Attorney, Agent, or Firm—Scully, Scott, Murphy & Presser

(57) ABSTRACT

The invention relates to a gelatinous jellying product containing water, a sweetening agent and a jellying agent, and to the use of the product for preparing gelatinized products. The invention also relates to gelatinized products prepared by using the aforementioned jellying product. The invention describes especially an alcohol-containing gelatinized product that has been manufactured with a jellying product according to the invention.

20 Claims, No Drawings

JELLYING PRODUCT

This application claims benefit under 35 U.S.C. 371 of PCT/FI97/00576, filed Sept. 25, 1997.

FIELD OF THE INVENTION

The invention relates to a gelatinous jellying product containing water, a sweetening agent and a jellying agent, and to the use of the product for preparing gelatinized products. The invention also relates to gelatinized products prepared by using the aforementioned jellying product. The invention describes especially an alcohol-containing gelatinized product that has been manufactured with a jellying product according to the invention. Other products include for example sweets, marmalade, dessert jellies and sorbets.

BACKGROUND OF THE INVENTION

Jellying agents and jellying products based thereon are well known in the field. The central ingredient in these products is usually pectin, another common ingredient is an organic acid, such as citric or tartaric acid. In order to prepare a jelly, the jellying agent and possible other ingredients are first dissolved, and the dissolved jellying agent is blended for example with a mixture of berries or fruit for the purpose of preparing jam, and sugar is then added to the mixture. The two-stage preparation is due to the poor solubility of pectin. If the solids content of the mixture is too high, the pectin does not dissolve and no gelatinizing effect is achieved.

The use of pectin-containing jellying agents has been facilitated by forming dry mixtures containing sugar, pectin and possibly an organic acid. In order to prevent the dry mixtures from caking, the sugar crystals are usually coated with pectin or a mixture of pectin and an acid. The products are prepared with complicated multi-stage processes and the particle size of the ingredients is an important parameter in the preparation. Such dry jellying products containing pectin and the preparation thereof are described for example in U.S. Pat. No. 4,800,096; DE 1,275,853; DE 1,800,141; DE 3,516,111; and U.S. Pat. No. 2,429,660.

Gelatin is another jellying agent that is widely used. Gelatin is available in the form of dry powder and dried gelatin foils. During use, both tile powder and the foil are first dissolved in hot water and the obtained solution is then mixed with the food to be gelatinized. Gelatin has also been used in dry mixtures that contain a sweetener, flavourings, aromatic agents, colouring agents and preservatives in addition to gelatin, and that are used especially for preparing dessert jellies.

When the commercially available jellying agents and products are used, the jellying agent must be completely dissolved. This requires troublesome stages of dissolving and/or cooking where both the times and temperatures of processing the products are crucial parameters.

BRIEF DESCRIPTION OF THE INVENTION

The present invention is based on a new kind of a jellying product that is gelatinous or substantially non-free-flowing at room temperature but that can be reversibly changed into a free-flowing stage simply by heating. The preparation process of the jellying product according to the invention is simple and the product can be easily used as an intermediate in the preparation of gelatinized products and after heating even as such.

The invention therefore relates to a gelatinous jellying product containing water, a sweetening agent, gelatin and possibly other ingredients.

The jellying product according to the invention is ready for use as such after heating. The preferred embodiment according to the present invention is, however, the use of the product as all intermediate in the preparation of different gelatinized products. Preferred final products according to the invention include alcohol-containing gelatinized products and especially alcohol-containing gelatinized drinks.

The invention therefore also relates to the use of the jellying product according to the invention for the preparation of gelatinized products, such as foodstuffs, beverages and sweets, and for baking. The product is suitable for use both on a small scale at home or at work and on a large scale in food, confectionery, beverage and stimulant-manufacturing industries.

The invention further relates to edible products, such as foodstuffs, bakery products, sweets and gelatinized drinks, containing a jellying product according to the invention.

A preferred embodiment of the invention is an alcohol-containing gelatinized product that is prepared by adding alcohol and possibly other usual ingredients to a jellying product according to the invention. These components can be added to the jellying product both during its manufacture and for example at home or in a restaurant to the basic product that has been made flowing by heating.

The invention also relates to a method for preparing gelatinized products by making the jellying product according to the invention free-flowing by heating, possibly by adding desired ingredients thereto and by allowing the flowing mixture to set.

DETAILED DESCRIPTION OF THE INVENTION

The invention thus relates to a gelatinous jellying product that is characterized in that it contains water, a sweetening agent and gelatin.

The jellying product according to the invention contains gelatin as the jellying agent. Gelatin is a well-known protein that is obtained especially from the collagen-containing parts of animals, such as skin, bone and ossein. Gelatin is produced from this collagen-containing material by decomposition, usually by either acid hydrolysis or alkaline hydrolysis, and different types of gelatin can be prepared by changing the process parameters. Gelatin is defined generally with the so-called Bloom value that indicates the strength of the gel formed under certain circumstances. Gelatin formed by both acid hydrolysis and alkaline hydrolysis is suitable for the purposes of the invention, and the Bloom value can also vary. The Bloom value of the gelatin is preferably about 100 to 260 BL. As regards the Bloom value, it can be said that when harder gels are desired, such as in the preparation of home-made sweets, gelatin having a higher Bloom value is used, and on the contrary, when the final product can be more flowing, gelatin having a lower Bloom value can be used. The jellying product according to the invention contains about 0.5 to 25% of a jellying agent, preferably about 5 to 20%, more preferably about 6 to 16% and particularly about 8 to 12%, calculated as percentages from the jellying product. The amount used depends on the desired degree of gelatinization of the jellying product and the gelatinized product; the harder the gel is to be, the more gelatin is needed. The amount used also depends on the Bloom value of the gelatin; when gelatin having a higher Bloom value is used, the amount may be smaller.

The sweetening agent may be a conventional sugar, such as sucrose, glucose or fructose, an aqueous solution thereof, a starch syrup, isoglucose, a sugar alcohol, such as sorbitol, lactitol or xylitol, or a mixture thereof. The sugar can also be replaced with a mixture of a builder and a sweetening agent. The builder may be polydextrose or inulin and the sweetening agent may be an intensive sweetener, a carbohydrate sweetener or a mixture thereof. Advantageous sweetening agents include for example aqueous solutions of sugars, and mixtures of sucrose and invert sugar. The jellying product according to the invention, contains about 50 to 90% of a sweetening agent, preferably about 55 to 85%, more preferably about 60 to 82%, and particularly about 65 to 78%, calculated as percentages of the jellying product. In addition to producing a product that is ready for use, the addition of a sweetening agent also has other advantageous effects. Due to the sweetening agent, the structure of the gelatinous jellying product is stronger and the product has a longer shelf life.

The jellying product according to the invention may also contain other usual or even unusual ingredients. Examples of such ingredients include alcohol and alcoholic beverages, preservatives, acidity-regulating agents, aromatic agents, flavourings, fruit and berry products, seasonings and milk products. The quality and quantity of ingredients added to the jellying product car) be used to regulate the structure, taste and other properties of the final product as desired. The amount of these other ingredients can be as high as 60%, naturally depending on the quality and dry substance content of the ingredient to be added and on the desired properties of the final product.

The dry substance content of the jellying product according to the invention is preferably about 60% or more, more preferably 67 to 78%.

The jellying product according to the invention is very useful for different applications. The non-flavoured basic jelly consisting of water, a sweetening agent and gelatin is suitable for use for example in alcohol-containing jellies, desserts, bakery products and sweets. Depending on the use, it is possible to add to the jellying product, during either its preparation or use, for example an alcoholic beverage, juice, soft drink or some other mixer; berries or berry products, such as strawberry, blueberry, currant, boysenberry, and purees prepared from these berries; fruit or fruit products, such as cherry, apple, pear, plum, citrus fruit etc.; milk products, such as milk, cream, yoghurt etc.; flavourinigs such as cocoa, liquorice, ammonium chloride, mint oil or other ethereal oils, cinnamon, vanilla etc; aromatic agents, flavourings and colouring agents accepted for use in foods; or water. The jellying product according to the invention is gelatinous at room temperature. It has a pleasant taste, consistency and mouth-feel, it is non-adhesive and it is easy to use. The structure of the final products prepared with the jellying product can be adjusted with the amount and quality of the added ingredients from a free-flowing product to a solid gel.

An especially preferred embodiment is the use of the product in alcohol-containinig gelatinized products. The structure of the final product can then be adjusted also by means of the amount and quality of the alcohol added, so that it varies from a liquid to a solid gel to provide for example a usual liquid drink, a gelatinized edible drink or a dessert. The amount of the alcohol in the final product may vary from 1 to 35%. A suitable amount is determined on the basis of taste.

The use of the jellying product according to the invention for preparing gelatinized products is simple. The product is made flowing by heating it for example in a microwave oven, a kettle, in a water bath or in an incubator. In a preferred embodiment, the jellying product according to the invention is packed in such a way that it can be heated directly in the package which may be a container made of for example paper, plastic or glass. The desired ingredients are then added to the free-flowing jellying product, the mixture is left in the original package or moved to a container of a desired shape and size and allowed to set at room temperature or in a cold place. The present invention therefore provides for the first time a simple manner of preparing a gelatinized product by heating the jellying product according to the invention in its package, by adding ingredients according to taste, if desired, by mixing and by allowing the mixture to set again. By means of adding desired ingredients, new kinds of products can be prepared, for example especially alcohol-containing gelatinized products, and conventional gelatinized products, such as jam or marmalade, jelly sweets, dessert jellies, sorbet, bakery products, etc.

The invention will be described in greater detail by means of the following examples. The examples are only provided in order to illustrate the invention and they should not be considered to restrict the scope of the invention in any way.

EXAMPLE 1

Preparation of a Jellying Product According to the Invention

The following raw materials were used for the basic jelly:

|  | amount, % | water content, % |
| --- | --- | --- |
| Water | 12–15 |  |
| Gelatin 100 BL | 8–10 | 8.0 |
| Neste 77 | 80–75 | 23.0 |

Water and gelatin (Rousselot) were mixed and dissolved at about 60° C. for about 30 min. The mixture was added to Neste 77 liquid sugar (Porkkalan Sokeripuhdistamo Oy) at about 45° C., mixed and packed into a container similar to a milk carton. The dry substance content of the jellying product is 67 to 69%.

EXAMPLE 2

Preparation of a Jellying Product According to the Invention

| Crystal sugar | 56–52% |
| --- | --- |
| Water | 13–14% |
| Starch syrup | 10% |
| Gelatin 220 BL | 8–10% |
| Water | 12–15% |

The sugar (Taloussokeri, Porkkalan) Sokeripuhdistamo Oy) was dissolved in water by heating the mixture to about 80° C. Starch syrup (Neson Oy) and gelatin (Rousselot) dissolved in water were mixed therein. The prepared solution was packed into a plastic-coated cardboard container similar to a milk carton. The dry substance content of the finished jellying product is 69 to 71%.

EXAMPLE 3
Preparation of a Jellying Product According to the Invention

| | |
|---|---|
| Crystal sugar | 52% |
| Water | 13% |
| Starch syrup | 10% |
| Gelatin 220 BL | 10% |
| Water | 15% |

The mixture of sugar (Taloussokeri) water and starch syrup was cooked to 100 to 120° C., it was cooled to 80° C., and dissolved gelatin was added thereto. The product was packed in the same manner as in example 2. When the cooking temperature is increased from 100° C. to 120° C., the dry substance content of the finished jellying product increases from about 71% to about 78%.

EXAMPLE 4
Preparation of a Jellying Product According to the Invention

12% of water and 8% of gelatin (Gelatin 220 BL, Rousselot) having a dry substance content of about 92% were dissolved at about 60° C. for about 30 min. 10% of sugar, the mixture of gelatin and water, 5% of apple juice concentrate, and food colouring were added to isoglucose (70%, Neson Oy) at about 60° C., mixed and packed into a plastic-covered paper container similar to a milk carton.

EXAMPLE 5
Preparation of a Jellying Product According to the Invention

12% of water and 8% of gelatin (Gelatin 220 BL, Rousselot) having a dry substance content of about 92% were dissolved at about 60° C. for about 30 min. 5% of sugar, the mixture of gelatin and water, and 20% of alcohol (40% by volume) were added to isoglucose (55%, Neson Oy) at about 60° C., mixed and packed into a plastic container.

EXAMPLE 6
Preparation of a Jellying Product According to the Invention

15% of water and 10% of gelatin (Gelatin 220 BL, Rousselot) having a dry substance content of about 92% were dissolved at about 60° C. for about 30 min. The mixture was added to maltitol syrup 75% (Xyrofin Ltd.) at 50° C., mixed and packed into a cardboard container.

EXAMPLE 7
Preparation of a Jellying Product According to the Invention

15% of water and 10% of gelatin (Gelatin 220 BL, Rousselot) having a dry substance content of about 92% were dissolved at about 60° C. for about 30 min. The mixture was added to a mixture of sugar, water and polydextrose (Xyrofin Ltd.) (45:32:23) at about 60° C., mixed and packed into a paper container.

Working Example 1
Preparation of Sweets

The jellying product according to the invention was heated in its package (opened) in a microwave oven for about 3 to 6 min depending on the power. The free-flowing jellying product was poured into a bowl, and alcohol (e.g. vodka or liqueur) or juice was added so that the proportion of the added ingredient was at most about 20%. The mixture was poured into molds and the portions were allowed to set in a refrigerator. The sweets were detached from the molds and served either sprinkled with sugar or as such.

Working Example 2
Preparation of a Gelatinized Drink

The jellying product according to the invention was heated in its package (opened) in a microwave oven for about 3 to 6 min depending on the power. The free-flowing jellying product was poured into a bowl, and alcohol (e.g. vodka or liqueur) or juice was added so that the proportion of the added ingredient was about 20 to 30%. The mixture was poured into edible waffle cups or glasses and allowed to set in a refrigerator. The drink in the cup can be taken as such, the mixture set in the glass is eaten with a spoon.

Working Example 3
Preparation of a Drinkable Gelatinized Drink

The jellying product according to the invention was heated in its package (opened) in a microwave oven for about 3 to 6 min depending on the power. The free-flowing jellying product was poured into a bowl, and alcohol (e.g. vodka or liqueur) and/or a mixer was added so that the proportion of the added ingredient was about 30 to 50%. The mixture was poured into glasses, allowed to set in a refrigerator and served as a gelatinous drink.

Working Example 4
Preparation of a Jelly Coating

The jellying product according to the invention was made free-flowing by heating in a water bath or in a microwave oven. The free-flowing jellying product was used as such as a cake glazing by spreading it on a cake decorated with fruit and by allowing it to set at room temperature.

Working Example 5
Preparation of a Jelly Cake

The jellying product according to the invention was made free-flowing by heating in a microwave oven. 20% of cream, 7% of strong coffee and 7% of whisky were added to the free-flowing jellying product, mixed and spread on a baked crust base, whereafter the cake was put in a refrigerator for setting.

The cake can also be prepared by using for example a sponge cake or biscuits as a base. Instead of an Irish coffee cake, for example a lemon jelly cake or a berry jelly cake can be prepared when the ingredients are changed.

Working Example 6
Preparation of a Dessert Jelly

The jellying product according to the invention was made free-flowing by heating in a water bath. 20% of cream, 10% of strong coffee and 10% of whisky were added to the free-flowing jellying product, mixed, poured into a cake mould and allowed to set in a refrigerator.

Working Example 7
Preparation of a Side Dish Jelly

The jellying product according to the invention was made free-flowing by heating in a microwave oven. 20% of cranberry puree and 10% of vodka were added to the free-flowing jellying product, mixed and allowed to set in a refrigerator.

What is claimed is:

1. A gelatinous jellying product, comprising water, a sweetening agent and gelatin, wherein the product can be reversibly converted into a free-flowing form by heating, and wherein the product has a dry substance content of about 60% about 85%.

2. A jellying product according to claim 1, comprising 50 to 90% of a sweetening agent and 0.5 to 25% of gelatin, calculated as percentages from the jellying product.

3. A jellying product according to claim 2, comprising about 5 to 20% of gelatin, calculated as percentages from the jellying product.

4. A jellying product according to claim 3, comprising about 6 to 16% of gelatin, calculated as a percentage of the jellying product.

5. A jellying product according to claim 4, comprising about 8 to 12% of gelatin, calculated as a percentage of the jellying product.

6. A jellying product according to claim 1, wherein the BL value of the gelatin is 100 to 260.

7. A jellying product according to claim 2, comprising about 55 to 85% of a sweetening agent, calculated as percentages from the jellying product.

8. A jellying product according to claim 7, comprising about 60 to 82% of a sweetening agent calculated as a percentage of the jellying product.

9. A jellying product according to claim 8, comprising about 65 to 78% of a sweetening agent calculated as a percentage of the jellying product.

10. A jellying product according to claim 1, wherein the sweetening agent is a sugar or an aqueous solution of a sugar, a starch syrup, isoglucose, a sugar alcohol, an intensive sweetener, or a mixture thereof.

11. A jellying product according to claim 10, wherein the sweetening agent is an aqueous solution of a sugar.

12. A jellying product according to claim 1, further comprising at least one other ingredient, wherein said other ingredient is selected from alcohol, a preservative, an acidity-regulating agent, an aromatic agent or a flavouring, a fruit or berry product, seasonings, or milk products.

13. A jellying product according to claim 12, wherein said other ingredient constitutes about 1 to 40% of said jellying product.

14. A method for preparing a gelatinized product, comprising making the jellying product of any of claims 1, 2, 6, 10 or 12 free-flowing by heating, adding at least one selected ingredient thereto, mixing the free-flowing jellying product and said selected ingredient, and allowing the free-flowing mixture to set.

15. An alcohol-containing gelatinized product prepared by the method of claim 14, wherein said selected ingredient is alcohol or an alcoholic drink mixture.

16. A gelatinized jam, prepared by the method of claim 14, wherein said selected ingredient is a berry or a fruit component.

17. A gelatinized sweet, prepared by the method of claim 14, wherein said selected ingredient is a confectionery ingredient.

18. The method of claim 14, wherein said selected ingredient is alcohol, an alcoholic drink mixture, a berry, a fruit component, or a confectionery ingredient.

19. A gelatinized product prepared by the method of claim 14.

20. A jellying product according to any one of claims 2, 6, 10 or 12 wherein said product has a dry substance content of about 70 to 90%.

\* \* \* \* \*